A. L. BAUSMAN.
MACHINE FOR AUTOMATICALLY MOLDING CONFECTIONERY.
APPLICATION FILED APR. 17, 1915.

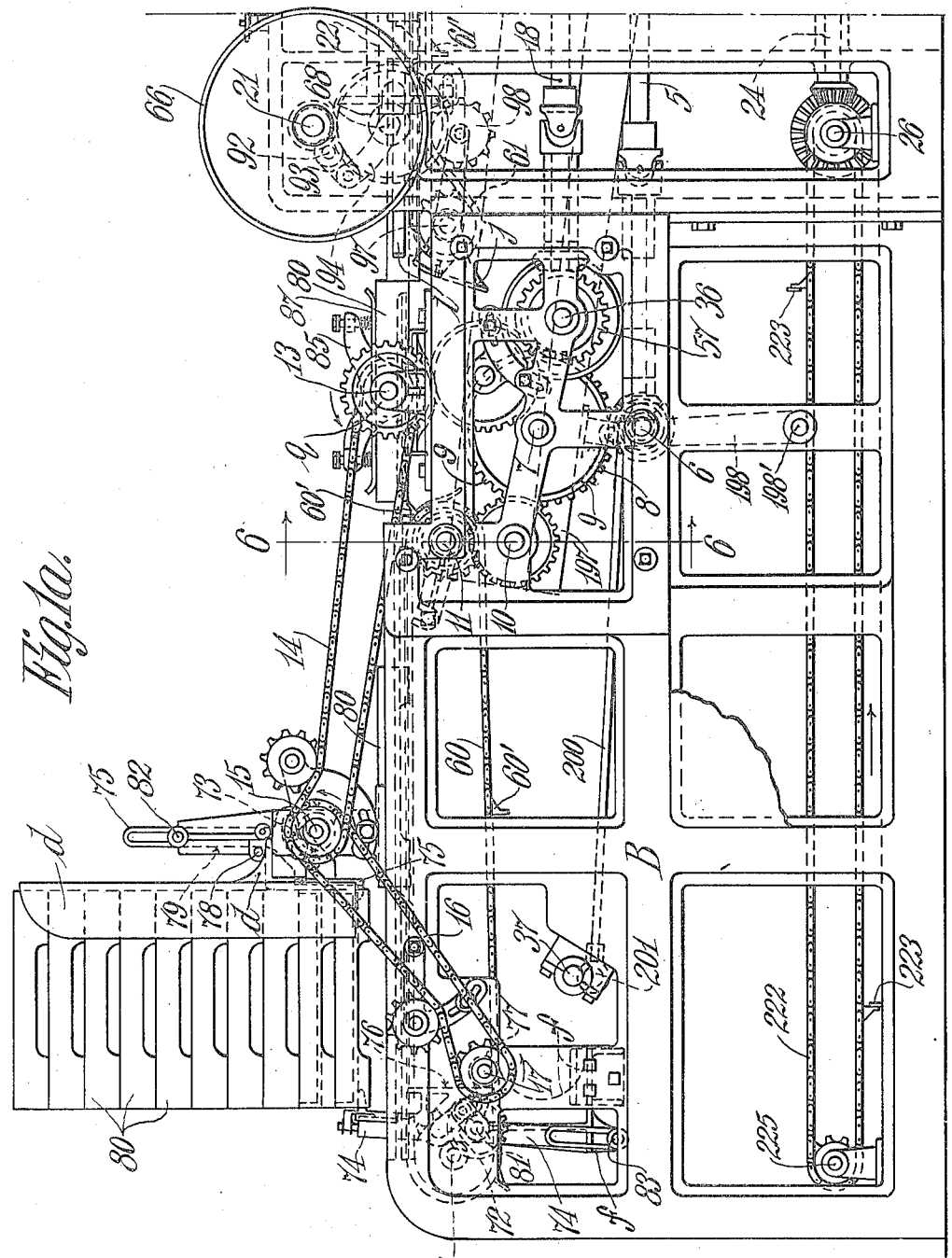

1,169,602. Patented Jan. 25, 1916.
13 SHEETS—SHEET 2.

WITNESSES:
INVENTOR.
Alonzo L. Bausman.
BY
ATTORNEY.

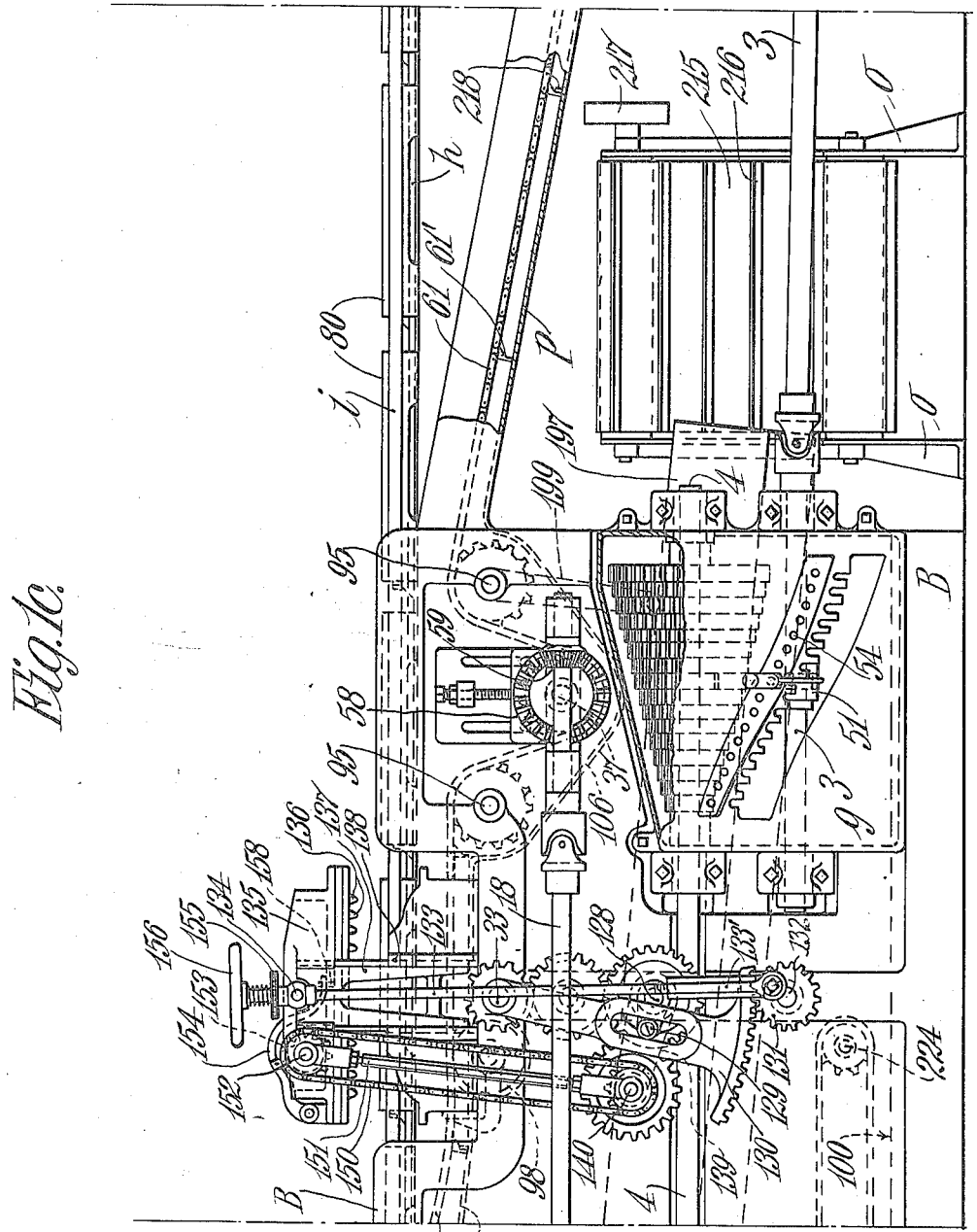

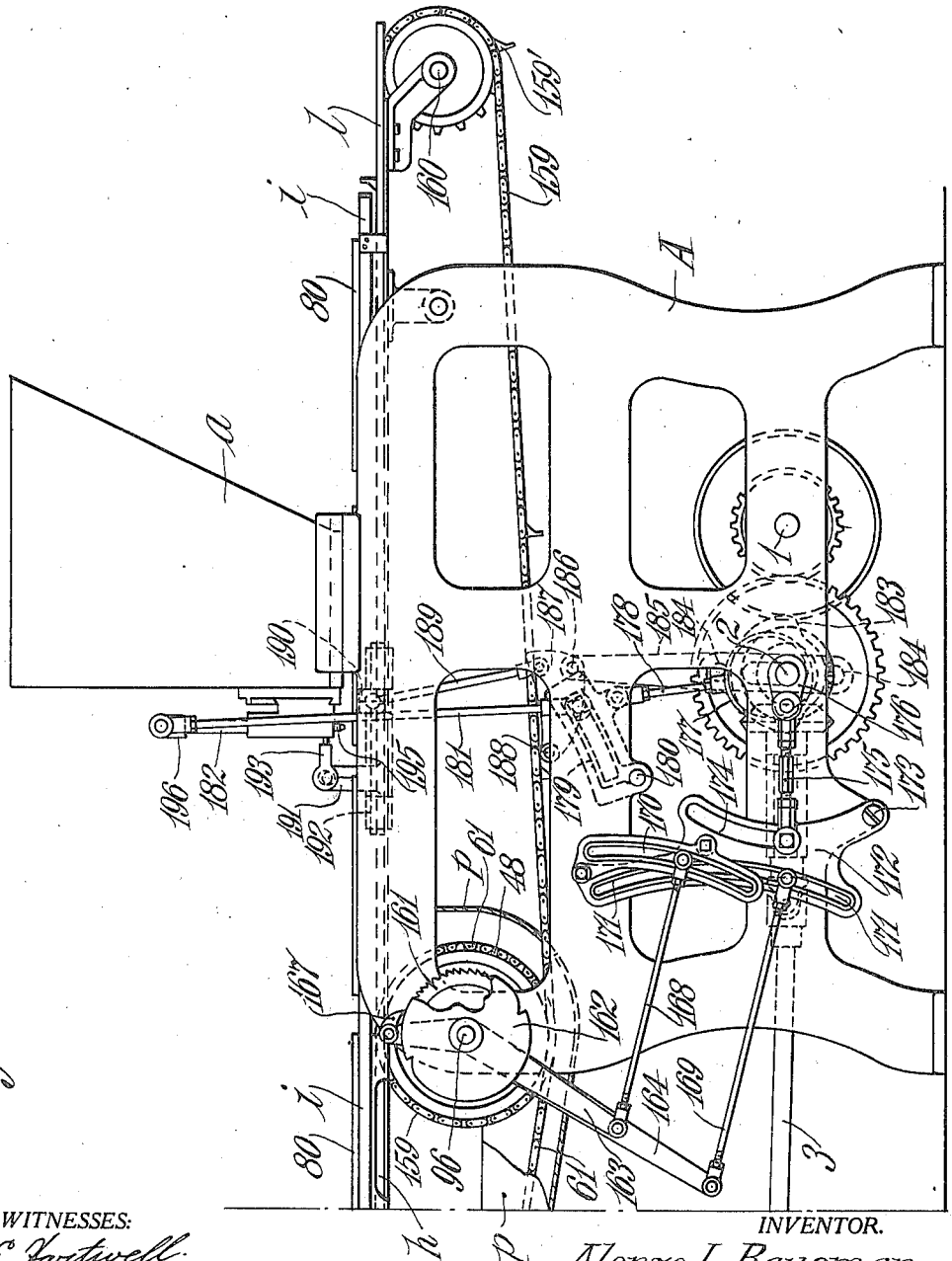

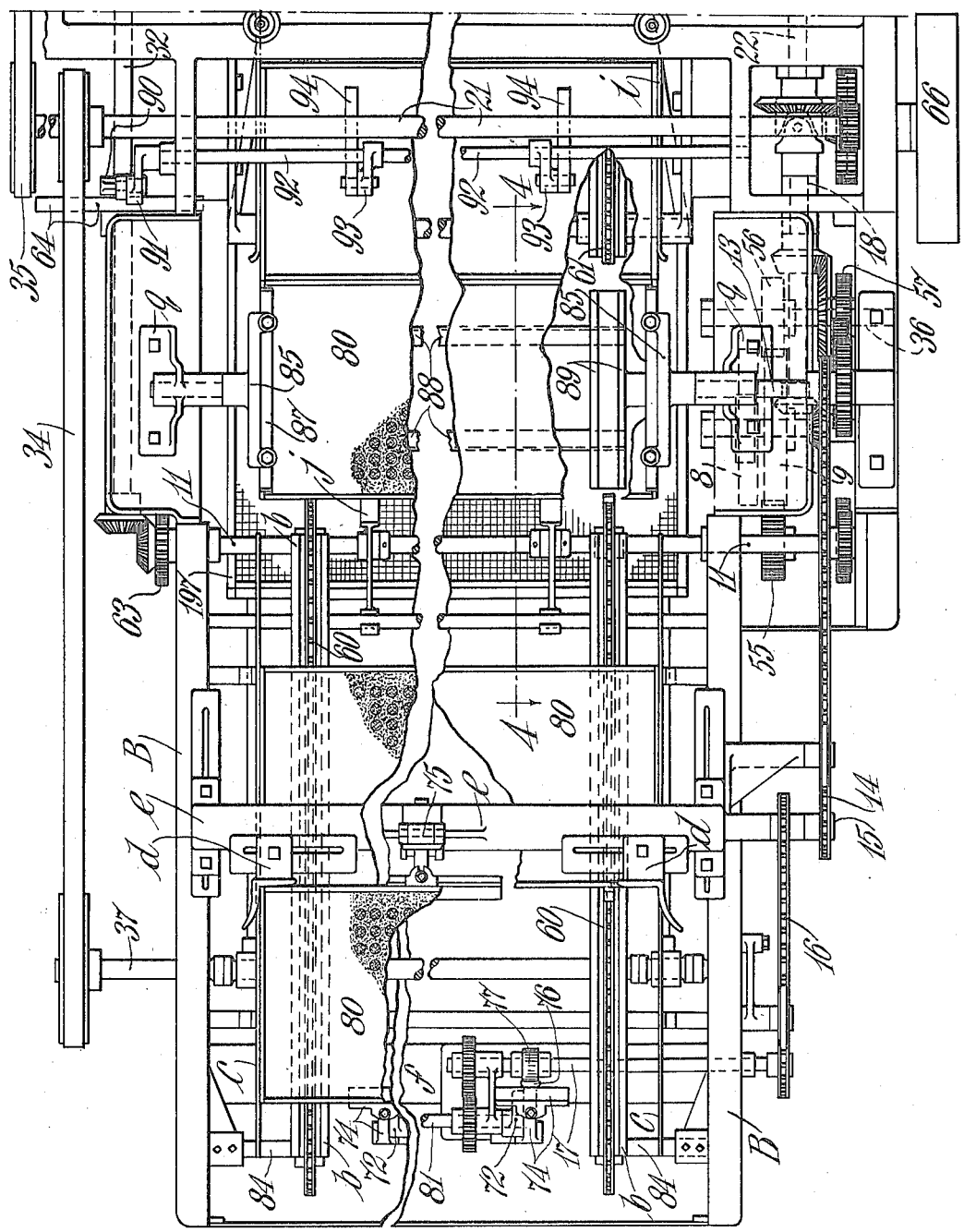

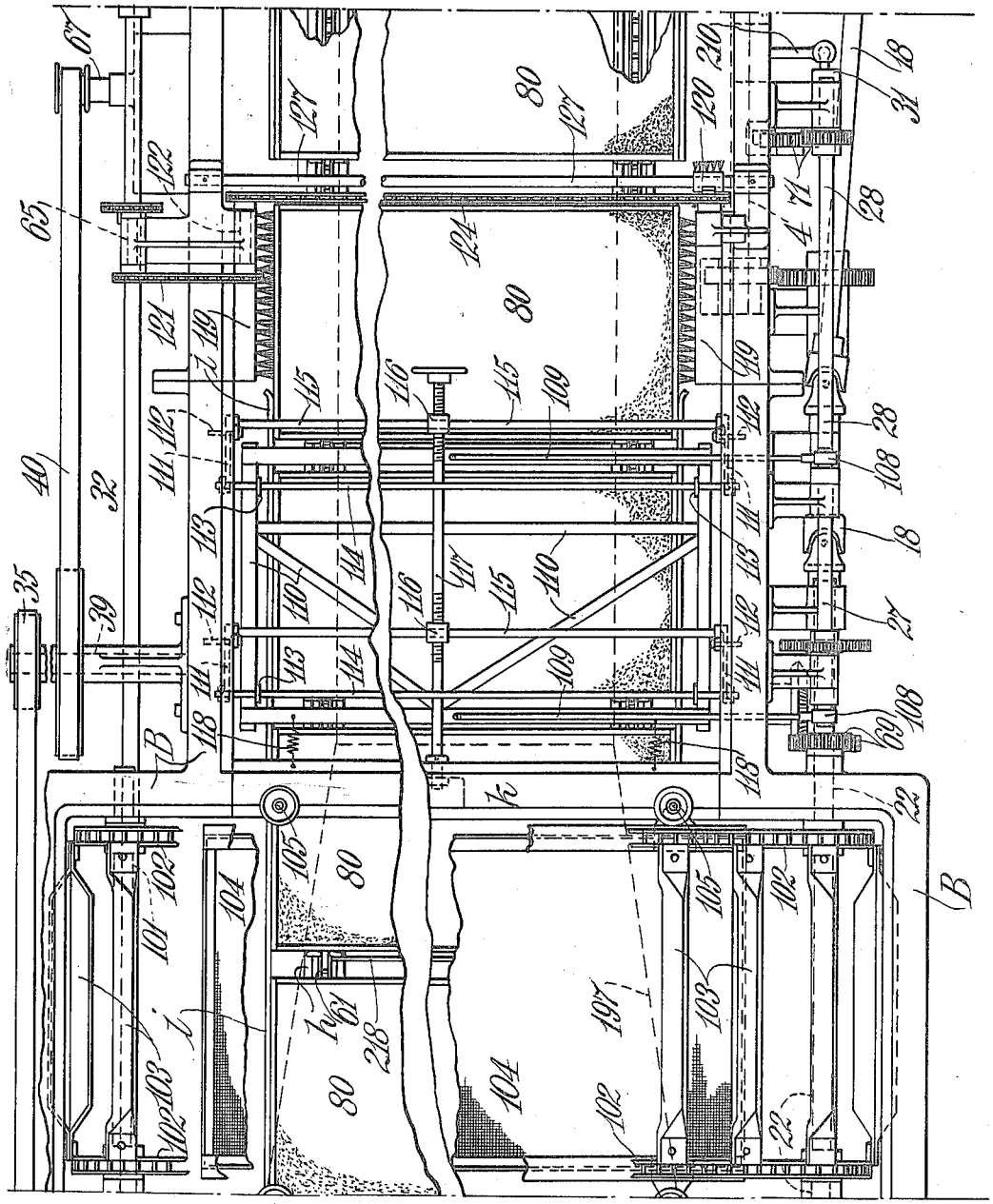

A. L. BAUSMAN.
MACHINE FOR AUTOMATICALLY MOLDING CONFECTIONERY.
APPLICATION FILED APR. 17, 1915.
1,169,602.  Patented Jan. 25, 1916.
13 SHEETS—SHEET 7.
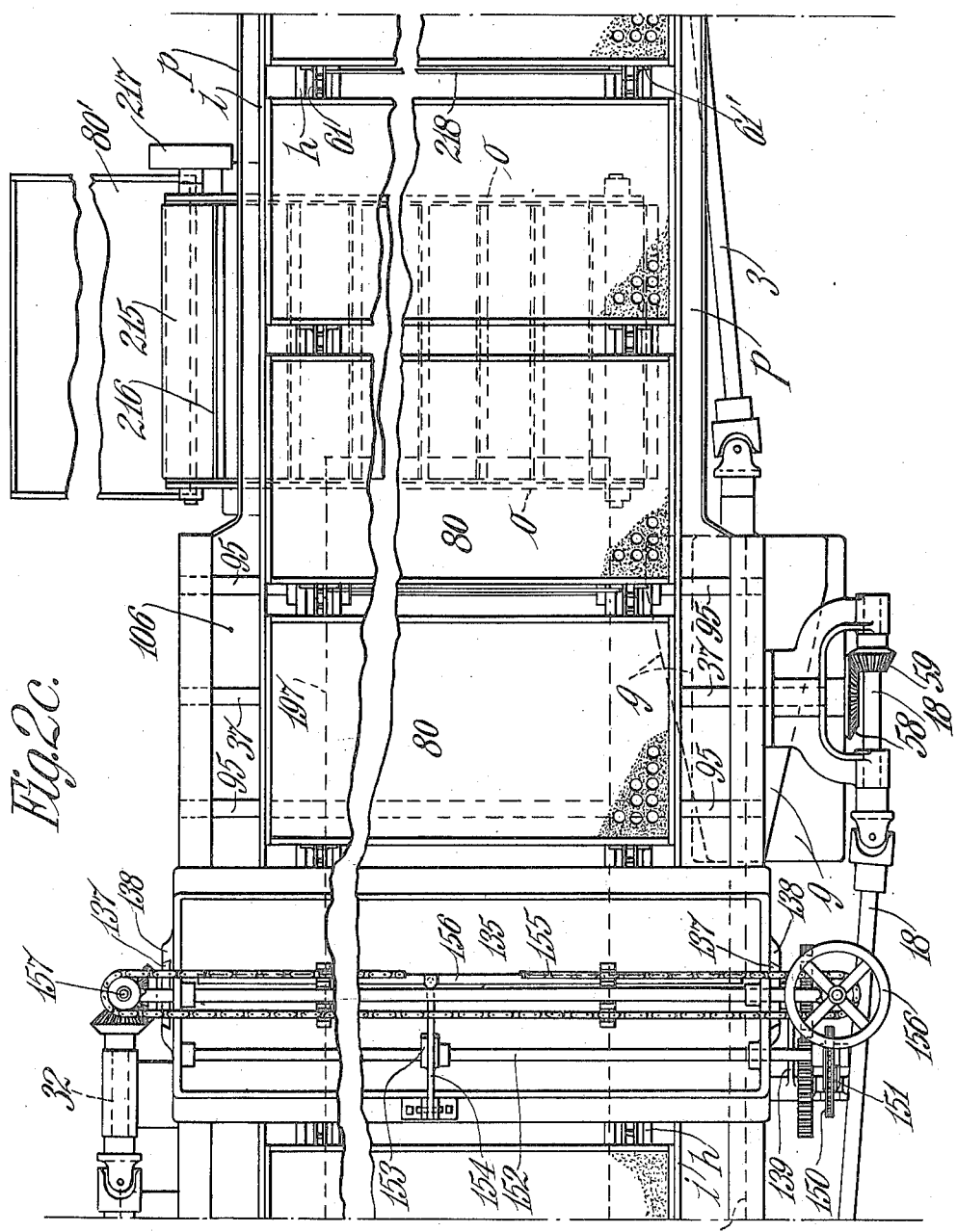
WITNESSES:  INVENTOR.
Alonzo L. Bausman.
BY
Chapin & Co.
ATTORNEY.

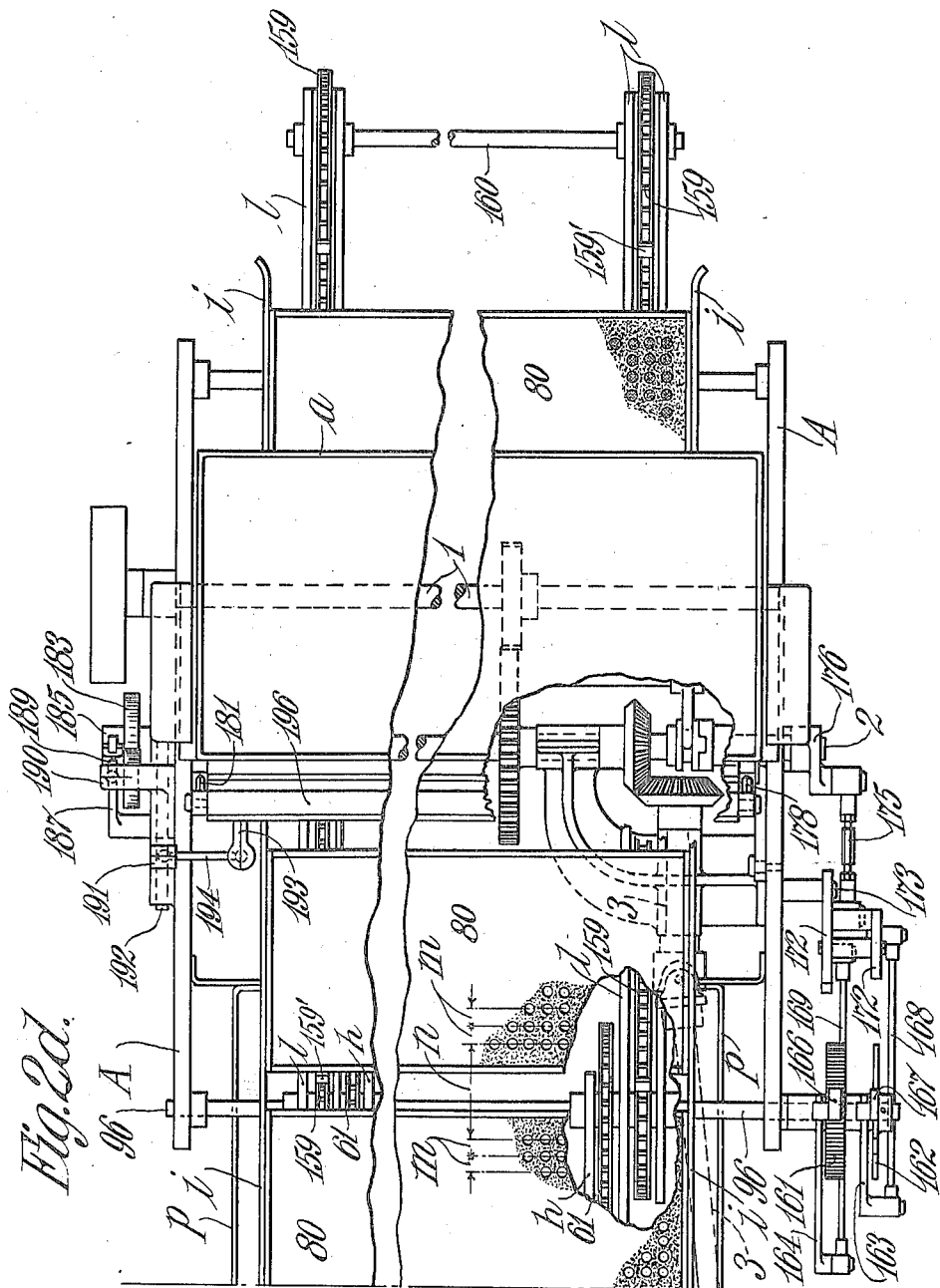

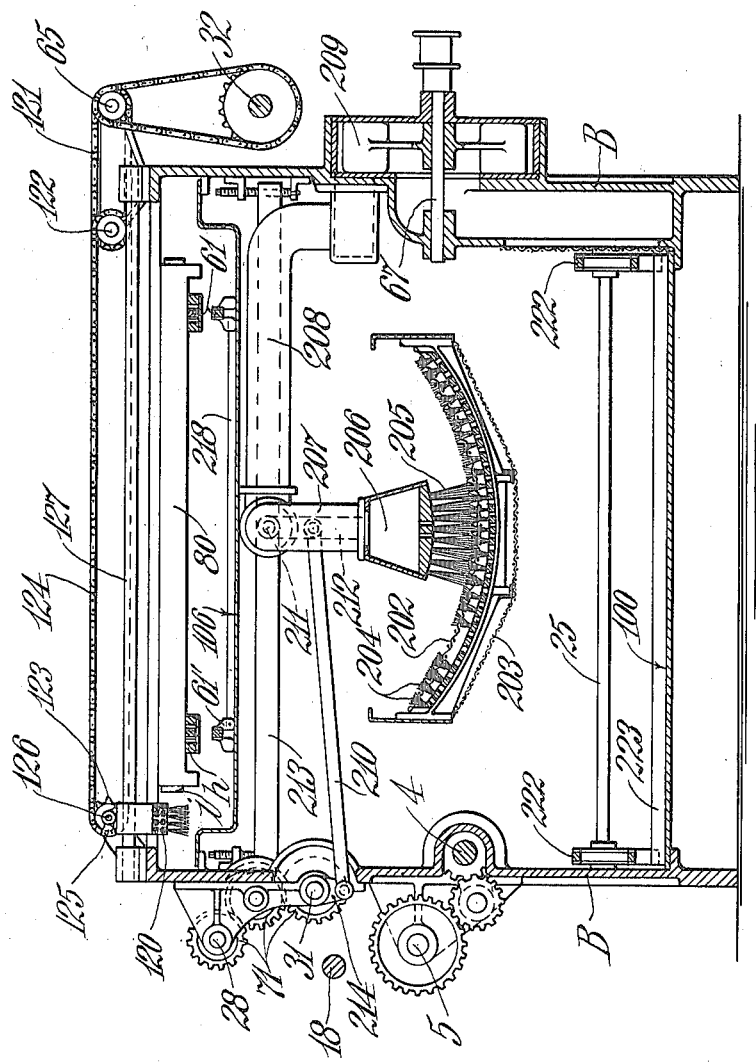

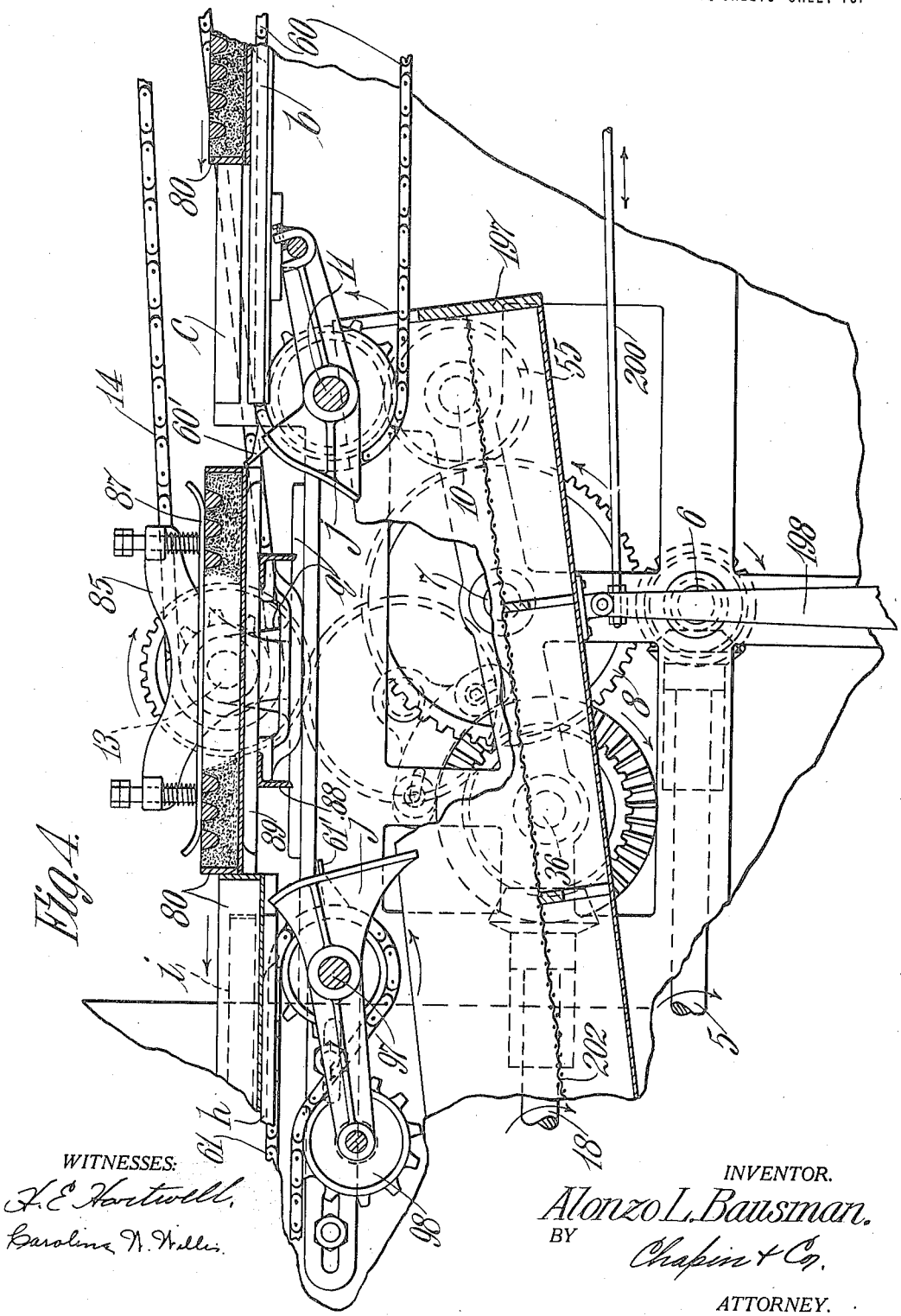

A. L. BAUSMAN.
MACHINE FOR AUTOMATICALLY MOLDING CONFECTIONERY.
APPLICATION FILED APR. 17, 1915.

1,169,602.

Patented Jan. 25, 1916.
13 SHEETS—SHEET 11.

WITNESSES:
F. E. Hartwell.
Caroline N. Willis.

INVENTOR.
Alonzo L. Bausman.
BY
Chapin & Co.
ATTORNEY.

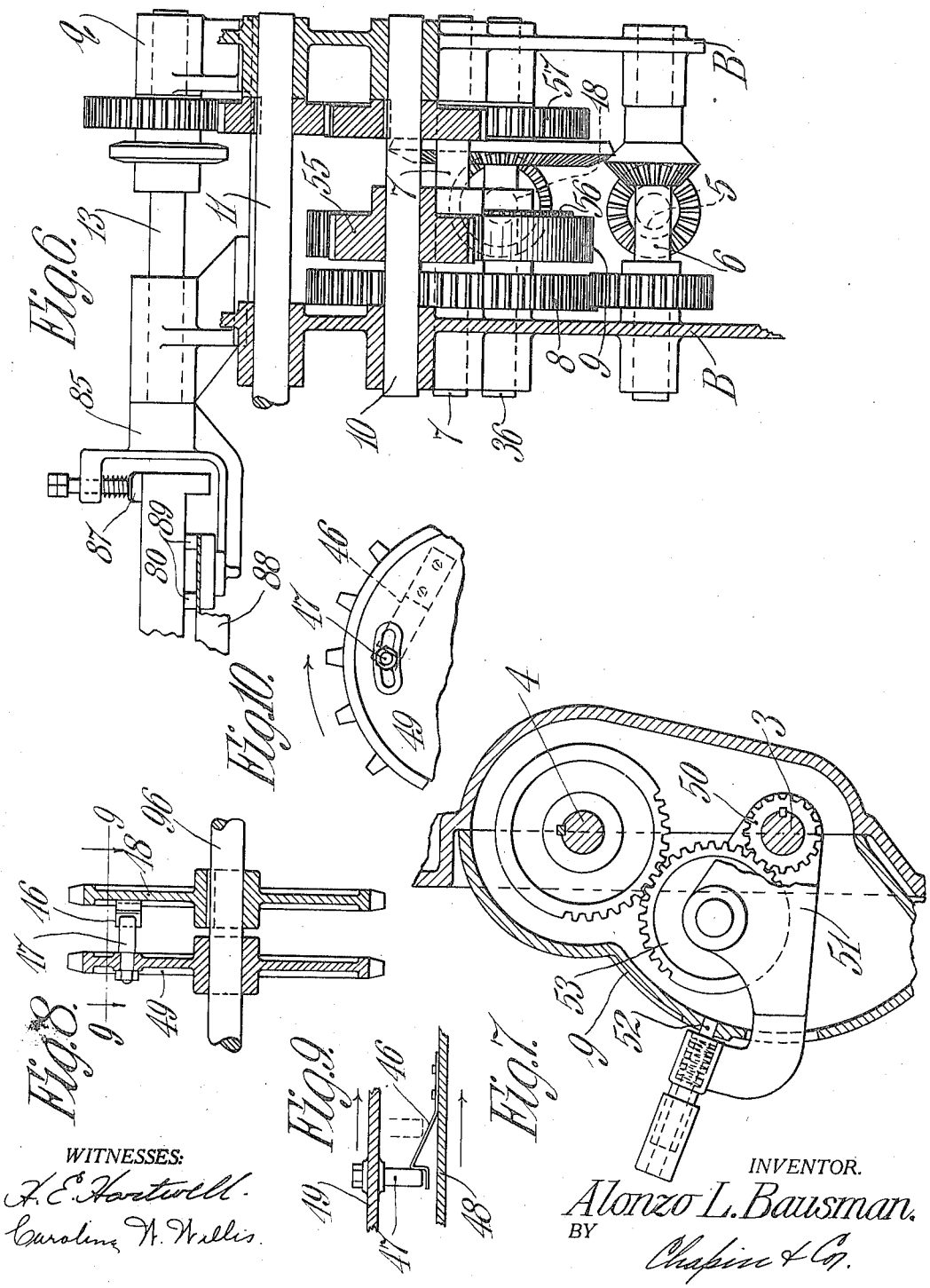

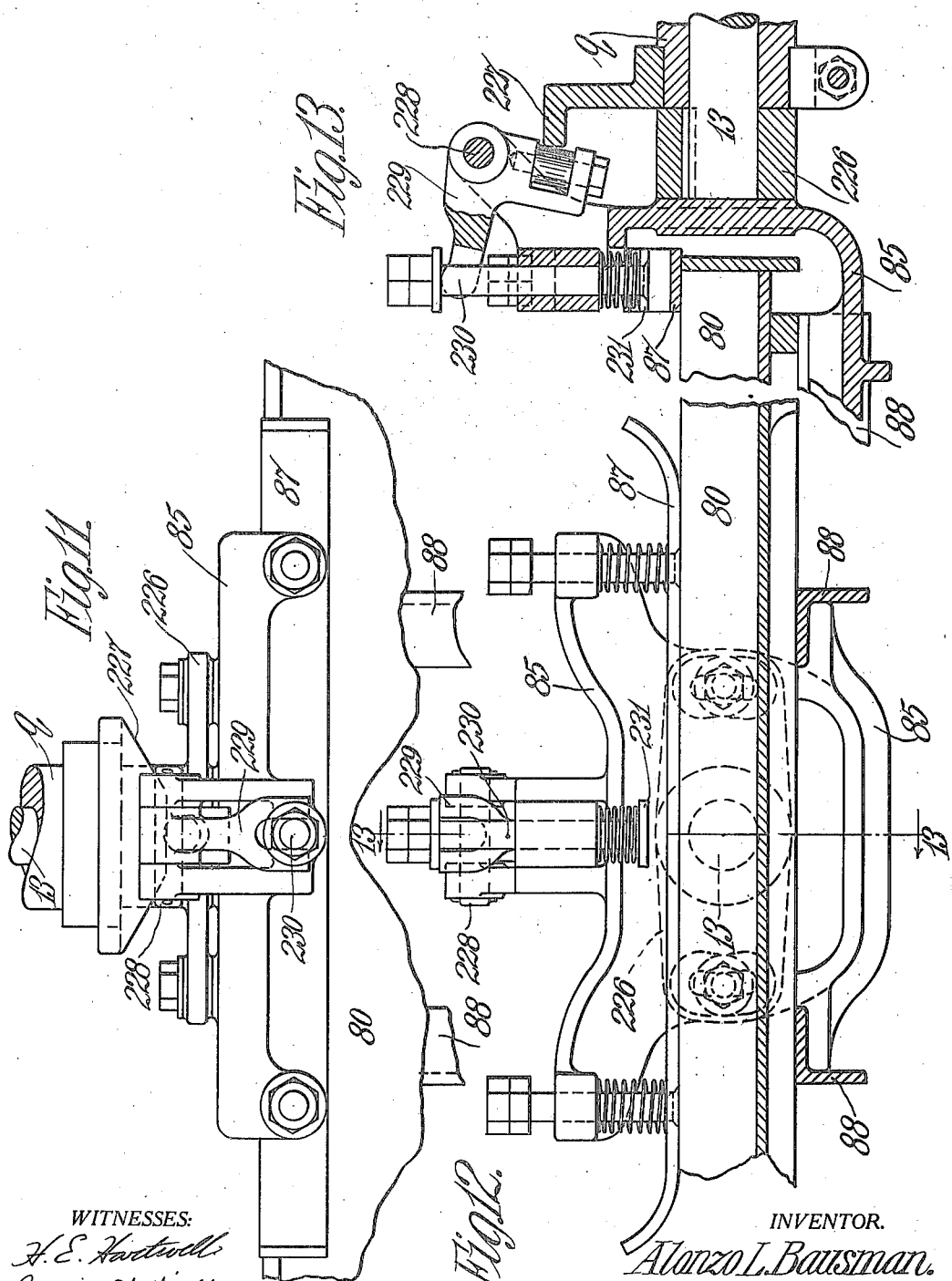

UNITED STATES PATENT OFFICE.

ALONZO LINTON BAUSMAN, OF SPRINGFIELD, MASSACHUSETTS.

MACHINE FOR AUTOMATICALLY MOLDING CONFECTIONERY.

1,169,602.   Specification of Letters Patent.   Patented Jan. 25, 1916.

Application filed April 17, 1915. Serial No. 21,995.

*To all whom it may concern:*

Be it known that I, ALONZO LINTON BAUSMAN, a citizen of the United States of America, residing in the city of Springfield, county of Hampden, and State of Massachusetts, have invented certain new and useful Improvements in Machines for Automatically Molding Confectionery, of which the following is a specification.

This invention relates to machines for automatically molding confectionery.

The operations involved are in general as follows: Each of a series of trays is successively filled with starch, the latter is uniformly leveled off, impressions or recesses having the desired form are made in the starch, these recesses are each filled with a measured quantity of confectionery, the latter is permitted to set, the trays are then emptied, the starch and molded confections are separated, each is suitably cleaned, the starch is used over again to fill the trays, and the cycle of operations is repeated.

Machines which are to a large degree automatic have heretofore been used to carry out the operations as stated. Such machines, however, have required the constant attention of several workmen to keep them running successively.

The object of this invention is to provide a confectionery molding machine in which the several parts are coördinated in an improved manner for the work desired, to improve the construction of such machine in various details as hereinafter pointed out, and more particularly to embody in such machines the improved construction and arrangement as pointed out and defined in the annexed claims.

In order that my invention may be clearly understood I have shown for illustrative purposes one preferred form in the accompanying drawings which will now be explained.

Figure 1B:
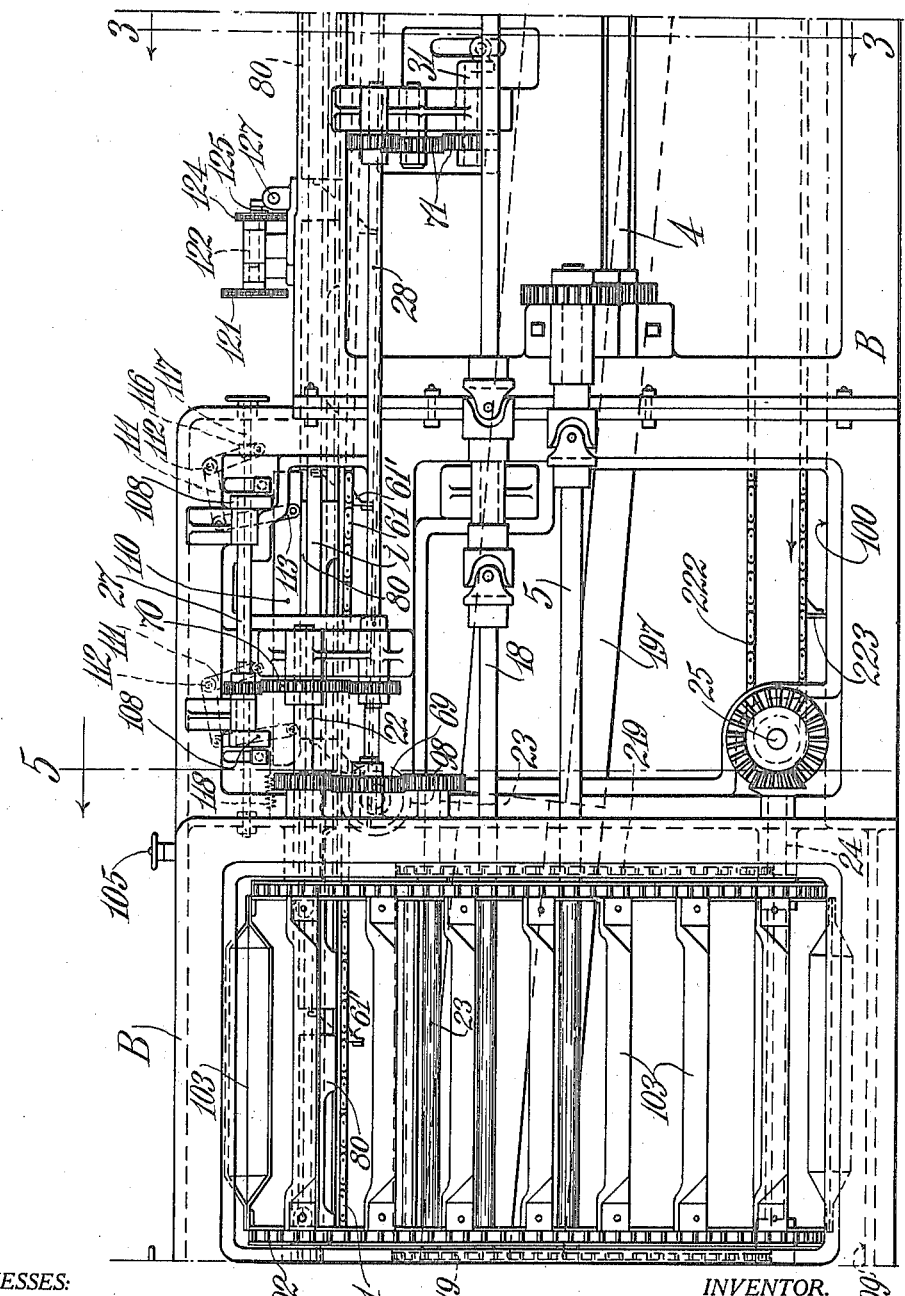
Figure 5:
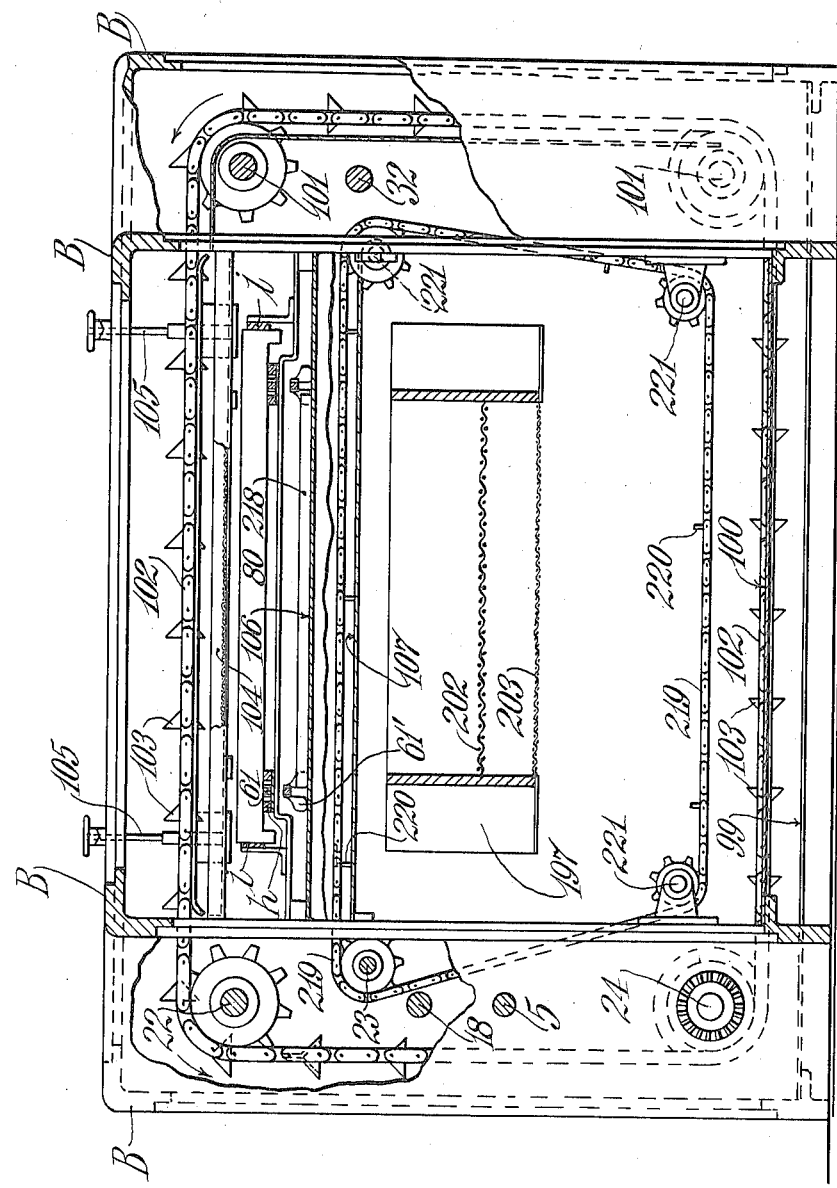

Figures 1ª, 1ᵇ, 1ᶜ, and 1ᵈ, taken together, end on end, show a side elevation of the complete machine which could not be satisfactorily shown on one sheet; Figs. 2ª, 2ᵇ, 2ᶜ, and 2ᵈ, show in a similar manner a plan view with certain parts broken away; Fig. 3 is a cross sectional view taken on line 3—3 of Fig. 1ᵇ; Fig. 4 is a detail cross sectional view taken on line 4—4 of Fig. 2ª; Fig. 5 is a cross sectional view taken on line 5—5 of Fig. 1ᵇ; Fig. 6 is a detail cross sectional view taken on line 6—6 of Fig. 1ª; Fig. 7 is a detail cross sectional view of the variable speed drive indicated in Fig. 1ᶜ; Fig. 8 is a detail cross sectional view of the improved means for insuring proper timed movements of the depositor drive; Fig. 9 is a detail sectional view taken on line 9—9 of Fig. 8; Fig. 10 is a detail elevational view of Fig. 9; Fig. 11 is a detail elevational view of a modified turn over mechanism; Fig. 12 is a cross sectional elevation thereof; Fig. 13 is a cross sectional view taken on line 13—13 of Fig. 12.

The main driving mechanism for the several parts of the machine will first be described. The main power shaft 1 (see Figs. 1ᵈ and 2ᵈ) is connected by spur gears to the driving shaft 2 of the depositor $a$. Driven from shaft 2 by the bevel gear connection clearly shown in Fig. 2ᵈ is a shaft 3 which extends to a selective gear drive located near the printer at the base of the machine in a gear case $g$. Mounted above the shaft 3 is a shaft 4 which has fixed thereon a number of gears of graded sizes. Slidably keyed to the shaft 3 is a pinion 50 (see Fig. 7) which is held between the spaced arms of a fork shaped member 51. The latter extends without the case $g$ through a curved slot (see Fig. 1ᶜ) and has mounted therein a pin 52. Above the curved slot is a series of holes 54 with which the pin 52, normally spring pressed inwardly, is adapted to engage. Also mounted in the member 51 is an intermediate gear 53 which is always in mesh with the pinion and, when the pin 52 is in one of the holes 54, to mesh with a corresponding gear on shaft 4. Thus, the shaft 4 may be driven at various speeds by shifting the member 51 longitudinally on shaft 3.

The shaft 4 drives through a gear connection clearly shown in Figs. 1ᵇ and 3, a shaft 5 which extends to a gear case immediately below the rotary dumper shown in Figs. 1ª, 2ª, and 6. Driven from shaft 5 by the miter gears clearly shown in Fig. 6 is a short transverse shaft 6 to which is fixed a pinion. The latter drives a gear 8 fixed to a short shaft 7 which also bears a mutilated gear 9 of the same pitch diameter. The gear 9 has half its teeth at the root line cut away, as shown in Figs. 1ª and 6, and drives alternately a gear 55 fixed to a short shaft 10 and a gear 56 fixed to a shaft 36. The shaft 10 is connected by the spur gears shown in Figs. 4 and 6 to a shaft 11 which is the operating shaft for the first set of conveyer chains 60.

Fixed on shaft 36 is a gear 57 which drives through an intermediate gear, a gear on shaft 13, all as clearly shown in Figs. 1ª and 4. The shaft 13 is the drive shaft for the rotary dumper and is connected by sprockets and a chain 14 to a shaft 15. The latter drives by a chain 16 another shaft 17. The shafts 16 and 17 are the operating shafts for the tray feeding apparatus.

The shaft 36 heretofore described drives by a bevel gear connection, clearly shown in Figs. 4 and 6, a shaft 18 which extends toward the depositor and parallel the shaft 4. This shaft 18 terminates just beyond the printer and drives by bevel gears 58 and 59 a transverse shaft 37 which is the operating shaft for the second set of conveyer chains 61, and conveys trays from the dumper to the depositor.

The drive shaft 11 for the conveyer chains 60 extends transversely across the machine (see Fig. 1ª) and bears a gear 63 which meshes with a similar gear on a stub shaft directly in under shaft 11. This stub shaft has a bevel gear connection with a shaft 32 which extends longitudinally of the machine to the printer. The shaft 32 drives by the bevel gears, clearly shown in Fig. 2ᶜ, a shaft 33 which extends transversely across the machine directly below the chains 61 (see Fig. 1ᶜ). This shaft 33 is the drive shaft for the printer. The shaft 32 has fixed thereon a path cam 64 (see Fig 2ª) which is the operating means for a tray "kicker". The latter operates in connection with the dumper in a manner to be hereinafter described. The shaft 32 is further connected by a chain and sprocket drive shown in Fig. 3 with a short shaft 65 which is the drive shaft for a traveling brush.

All of the drives heretofore described are operated from and timed with the depositor. The driving connections which will now be described are not operated from the depositor since the devices to be actuated need not be timed with the depositor for successful operation of the machine. A pulley 66 (see Figs. 1ª and 2ª) drives a shaft 21 which extends entirely across the machine as shown in Fig. 2ª. This shaft 21 drives by a pulley and belt 34 a transversely disposed shaft 37 which is the operating shaft for the sieve vibrator. The shaft 21 also drives by a belt connection 35 a stub shaft 39 (see Fig. 2ᵇ) which in turn drives by a belt connection 40 a shaft 67. The latter is the drive shaft for the fan which supplies air to the swinging air brush. The shaft 21 (see Fig. 1ª) is connected by spur gears to a short shaft 68 which drives by the bevel gear connection, shown in Figs. 1ª and 2ª, a shaft 22. This shaft is longitudinally disposed near the top of the machine (see Figs. 1ᵇ and 5) and drives directly by sprockets thereon (see Fig. 5) the starch elevating and filling devices. The shaft 22 also drives by the gear set 69 (see Fig. 1ᵇ) a parallel shaft 23 which is the driving shaft for scraper devices, which return excess starch, not used to fill the trays, to the starch pit. A gear 70 fixed to the shaft 22 drives a shaft 27 which is the operating shaft for the leveler and a parallel shaft 28. The latter drives through a gear set 71 a short shaft 31 which is the drive shaft for the swinging air brush. A shaft 24 (see Figs. 1ª, 1ᵇ and 5) is an idler shaft in the starch elevating apparatus and has on either end thereof a bevel gear connection with transversely arranged shafts 25 and 26. The latter are drive shafts for scrapers which return starch from either side of the tray filling apparatus to the starch pit thereof.

The tray feeding devices will now be described and reference will be made to Figs. 1ª and 2ª. Mounted upon a bridge e which extends across the frame B are spaced, adjustable angle guides d. A pile of trays 80 abut these guides d on two corners and are supported from the lowermost tray, on one side by a centrally arranged lever 75, and on the other by two spaced levers 74. These levers 74 and 75 have lips which extend in under and support the lowermost tray 80 as clearly shown in Figs. 1ª and 2ª. The levers 74 are pivotally connected at 83 with a pin and slot connection to a suitable bracket f and the lever 75 in a similar manner at 82 to a bracket on the bridge e. The drive shaft 15 has thereon a crank 73 and the drive shaft 17 is gear connected to a shaft 81 which has similar cranks 72. Each of these cranks has a pin which rides in a cam slot formed in each of the levers 74 and 75. The levers 74 have flanges 76 which engage rolls 77 fixed on shaft 17. One side of the lever 75 has a plane surface 79 which engages a pin 78 in the supporting bracket. The tray feeding apparatus is shown as about to deliver a tray 80 to the runways b and the shaft 17, driven in the direction of the arrow shown in Fig. 1ª, will turn the crank 72. Continued rotation of this crank will cause the pin thereof to engage the bottom of the cam slot in lever 74 and will force the latter downward as permitted by the pin 83 and slot connection therewith. At the same time the crank 73 driven by shaft 15 will lower the lever 75 in a similar manner and the entire pile of trays will be lowered until the bottom one rests on the runways b. The levers 74 and 75 continue their downward movement a slight amount and are thereafter thrown outwardly from the trays to disengage the supporting lips from the lowermost tray. The levers are next raised by the crank and cam slot device and then carried inwardly so that the lips on the levers underlie the bottom of the tray next above the one deposited on the trackway *b*. The upward movement continues sufficiently to raise the pile of trays 80 from the tray on the runway and then the cranks come to rest in the position shown in the drawings. It should be noted that inwardly movement of the levers 74 and 75 toward the trays is restrained in the former case by the abutment of the flange 76 on the roll 77 and in the latter instance by the engagement of the plane surface 79 with the pin 78.

The conveying apparatus for moving the tray deposited on the trackway to the dumper or tumbler will now be described. This apparatus comprises chains 60 having lugs 60' thereon which are carried by spaced sprockets fixed to shaft 11 and stub shafts 84 (see Fig. 2$^a$). These chains are directly propelled by the drive shaft 11 and operate, while the tray feeding device and the dumper are at rest due to the intermittent drive by the mutilated gear 9. The lugs 60' engage a tray 80 delivered by the feeding device, propel the same a definite distance along the runways *b* and between the side guides *c*, and then come to rest. On the next succeeding operation of the shaft 11, the tray so moved, is propelled to the dumper and forced therein.

The dumping mechanism will now be described and reference will be made to Figs. 1$^a$, 2$^a$, 4 and 6. The drive shaft 13 is suitably mounted in the bracket *g* and has fixed thereto at one end a casting 85. The latter has upwardly extending arms, which support spring pressed clamping jaws. On the other side of the machine is another casting 85 similarly mounted and constructed. These two members 85 are tied together by spaced angle irons 88 as indicated in Figs. 2$^a$, 4 and 6. Suitable runways 89 are mounted upon the members 85, as shown in Figs. 4 and 6 to form continuations of the runways *b*. Referring to Fig. 4, the lug 60' has just forced a tray upon the runways 89 and beneath the clamping jaws 87. After the lug 60' has left and moved out of the path of the tray 80, the chains 60 come to rest and the shaft 13 is turned by the gear connection, heretofore described, one complete revolution. The contents of the tray during this revolution fall therefrom upon a sieve immediately below. Suitable guards *j* are mounted as shown and prevent a tray improperly positioned in the dumper from damaging the rest of the mechanism. It will be seen from Fig. 4 that, as a tray 80 is pushed into the dumper by the lugs 60', the tray formerly therein is expelled by the incoming tray. It will also be obvious from Fig. 4 that the expelled tray must be moved a slight additional distance from the position shown before the dumper can rotate and before the lugs 61' on conveyer chains 61 can engage the end of the tray to move the same. This additional movement of the tray is obtained by a device shown in Figs. 1$^a$ and 2$^a$, which is operated from the cam 64 on shaft 32 previously described. A shaft 92 is mounted in the frames B and bears at one end a crank 91. Pivotally connected to the latter is a lever 90 which may be suitably forked to ride on the shaft 32 and which has a roll to engage in a path formed in one face of cam 64. The path in the latter (not shown) is suitably formed to impart a sharp downward pull on lever 90 just prior to the operation of the dumper. Cranks 93 fixed on shaft 92 have curved arms 94 (see Fig. 1$^a$) pivotally connected thereto. These arms 94 normally rest in the tray on the bottom thereof and, when a tray is pushed from the dumper, are readily moved upwardly by the tray to permit its passage. At suitably timed intervals the lever 90 is actuated to impart a "kick" to the arms 94 which force the forward wall of the tray a distance just sufficient to permit the lugs 61' to engage the rear end of the tray.

The means for moving the trays from the dumper to the depositor will now be described which consists of conveyer chains 61 having lugs 61' disposed thereon at regular intervals. These chains are driven from the drive shaft 37 (see Figs. 1$^c$ and 2$^c$) and extend from sprockets on shaft 97 (see Figs. 1$^a$ and 2$^a$) to sprockets on a shaft 96 on the depositor (Figs. 1$^d$ and 2$^d$). The sprockets on shaft 96, carrying the chains 61, are loosely mounted thereon for a purpose later to be described. The chains 61 travel on their upper course between runways *h* similar to the runways *b* and the trays rest on these runways and are positioned by side guides *i*. The lower course of the chains is over suitable idler sprockets 98 disposed at intervals along the machine, and sprockets on shafts 95 and drive shaft 37. (See Figs. 1$^c$ and 2$^c$). The sprocket on shaft 37 is vertically adjustable and forms with the sprockets on shafts 95 a chain tightening device. These chains 61 operate intermittently at the same time that the tray feeding apparatus and the dumper operate and move the trays 80 step by step in spaced relation along the runways.

The trays 80 so moved pass first to the filling apparatus which will now be described and reference will be made to Figs. 1$^b$, 2$^b$, and 5. The latter figure, although taken as a section on the line 5—5 of Fig. 1$^b$ has certain parts broken away to reveal parts in the starch filling section of the machine. 99 represents the lower floor of the starch pit and 100 the lower floor of the rest of the machine. Starch is returned by means to be described from the floor 100 and falls to the floor 99. Spaced chains 102 mounted on sprockets on shafts 22, 24 and two idler shafts 101 are driven from the former shaft as has already been described. Mounted transversely between these chains are buckets 103 formed of angle iron bent into the shape shown in Figs. 1$^b$ and 2$^b$. These buckets move transversely across the machine near the floor 99 and scoop up starch which is carried upwardly and over the trays 80. The buckets 103 empty into a screen 104 suitably supported by bolts 105 and the starch sifts through the screen into the tray thereunder. Surplus starch from the filling operation falls upon an upper floor 107. The floor 106 shown in Fig. 5 does not underlie the screen 104 but is a floor similar to the floor 100 and terminates at the filling apparatus in a manner later to be described. The trays heaped with starch next pass under a leveler device which will now be described with particular reference to Figs. 1$^b$ and 2$^b$. Pivotally mounted on each side of the machine at 112 are a pair of bell cranks 111. Each arm of each bell crank 111 is connected to the corresponding arm of the opposite bell crank by rods 114 and 115 which extend entirely across the machine. Each rod 114 bears thereon spaced links 113 which support a leveler frame 110 having angularly arranged arms resembling a plow. The rods 115 have fixed thereon blocks 116 which extend upwardly from the rods 115 as shown in Fig. 1$^b$. Passing through each block 116 is a threaded rod 117 one end of which is rotatably held in the bridge $k$ as shown in Fig. 2$^b$. Springs 118 extend between the bridge $k$ and the leveler 110 and tend to pull the latter toward the bridge. The rod 117 when turned raises or lowers the frame 110 in an obvious manner through the bell crank levers. This frame is normally set with its lower surface of the tray and the end of the frame 110 first engaged by a tray 80 is rounded as shown in Fig. 2$^b$. When a tray strikes the leveler the latter is slightly raised and moved forwardly against the tension of springs 118 so that the frame bears against the top of the tray 80, with a yielding pressure. Attached to the frame 110 are rods 109, connected to cranks 108 on the drive shaft 27 heretofore described, which constantly vibrate the frame 110. The plow shaped frame 110 vibrated as described, scrapes the surplus starch from the tray leaving a smooth level surface.

The trays, after leaving the leveler, are next thoroughly brushed by means which will now be described. Fixed to the side frames B, one either side of the machine, are stationary brushes 119, the bristles of which extend inwardly and engage the end surfaces of the trays 80. These brushes are best seen in Fig. 2$^b$ and it will be noted that the side guides $i$ are cut away to permit the ends of the tray to be brushed. The trays are moved past these brushes 119 and come to rest in the position shown in Fig. 2$^b$ in which position a transversely movable brush 120 cleans the forward surface of one tray and the rear surface of the tray immediately in back. This brush 120 is driven from the shaft 65 heretofore described. Chain 121 connects with a stub shaft 122 (see Figs. 2$^b$ and 3) which has fixed thereon a sprocket. On the other side of the machine is a similar sprocket 123 rotatably mounted in a suitable bracket. A chain 124 passes over these sprockets and is intermittently driven at the same time as the chains 60 and while the chains 61 are at rest by connections already described from the intermittent gear 9. The chain 124 (see Fig. 3) has thereon a lug 125 which is pivotally connected at 126 with the frame of the brush 120. The latter is slidably mounted on a rod 127 mounted in brackets at each side of the machine. It will be noted that the pivotal point 126 is coincident with the center of the sprocket 123. As the latter turns, the lug 125 will turn through ninety degrees before moving the brush 120 and will thereafter on continued movement propel the brush across the machine. The chain 124 comes to rest with the lug 125 in a similar position on the other side of the machine. This brush 120 has bristles on each side thereof which clean the adjacent surfaces of two trays as described, and also has bristles in the bottom thereof which brush the runways $h$. It will be noted from Fig. 2$^b$ that the brush 120 comes to rest in such a position as not to interfere with the passage of the trays 80.

The trays 80 having been filled, leveled and brushed, are next carried by the chains 61 to and come to rest beneath a printer which will now be described. The printer (see Figs. 1$^c$ and 2$^c$) is driven from the shaft 33 heretofore described and fixed thereto is a gear which drives through an intermediate gear a gear on shaft 128. On the end of the latter is a crank 129, the pin of which engages in a slot in an arm 130 which depends from and is loosely mounted on shaft 33. This arm 130 has at its end a segmental gear which meshes with a pinion 131 fixed to a shaft 132. Pivotally and eccentrically connected to the gear 131 is a connecting rod 133 which extends upwardly and is pivotally connected at 134 to a horizontal frame 135. The latter bears on its under side a series of cores 136 which, when impressed on the starch in a tray 80, form molds therein. The frame 135 has depending guides 137 on either side thereof which are freely movable in ways 138 fixed to brackets attached to frames B. The rod 133 has an adjustable screw thread connection with its lower portion 133' so that when the rod is turned by a hand wheel 156 its length may be altered. Although not shown in the drawings it is to be understood that the shaft 132 may extend entirely across the machine and have a similar connection with a similar rod 157. These rods 133 and 157 are interconnected by a chain 155 whereby, when one shaft is turned the other must be turned an equal amount. When the shaft 33 is operated the segmental gear arm 130 is moved by the crank 129 to turn the pinion 131 and pull the frame 135 downwardly by the rods 133 and 157. The cores 136 are thus impressed into the starch forming molds.

Before the frame 135 is lifted to withdraw the cores 136 from the starch the frame is wrapped in a manner now to be described to loosen the cores 136. Loosely mounted on shaft 128 is a radius arm 139 which bears at its end a stud 140. On the latter is a gear, which is driven by the gear on shaft 128, and a sprocket. The latter drives by a chain 150 a similar sprocket on the shaft 152. The shafts 152 and 140 are tied together by a radius rod 151 which in connection with the arm 139 permits reciprocating movement of the frame 135 without disturbance of the driving connections just described. Centrally arranged on shaft 152 is a ratchet 153 which engages an arm 154 pivoted to the frame 135 as shown. One end of the arm 154 is attached to a plate 156 which extends entirely across the frame 135 and has depending therefrom at intervals a number of pins 158. The arm 154, engaged by the connections described, imparts a series of sharp raps to the arm. These raps are communicated to the pins 158 which act on the frame 135 and loosen the cores from the starch.

The depositing apparatus whereby the molds formed as described are filled will now be described with particular reference to Figs. 1$^d$ and 2$^d$. The chains 61 deliver the trays along the runways $h$ to similar runways $l$ on the depositor and leave each tray in a position to be engaged by lugs 159' on chains 159. These chains are carried by sprockets on shafts 96 and 160 and are adapted to be driven from the former shaft in a manner now to be described. Fixed to one end of the sprocket shaft 96 is a ratchet wheel 161 and a disk 162 which has two notches in the periphery thereof. Loose on the shaft 96 is a bent lever 164 bearing at its upper end a pawl 166 which engages the ratchet 161. Also loosely mounted on shaft 96 is an arm 163 having a pawl 167 at its upper end which bears on the disk 162. The arms 163 and 164 are connected by rods 168 and 169 to a member 172 which is pivoted to the depositor frame A at 173. The rods 168 and 169 are connected to the member 172 by studs, which are adjustable in curved slots 170 and 171 respectively. The radii of the slots 170 and 171 are equal to the lengths of their respective connecting rods 168 and 169 so that the points of connection of the rods with the member 172 may be altered without changing the angular position of the pawls 166 and 167 on the ratchet wheel and disk. On the end of the main drive shaft is a crank 176 which is connected by a rod 175 to the member 172. The connection of the rod 175 to the member 172 is made by a stud riding in a curved slot 174 of a radius equal to the length of the connecting rod. As the crank 176 rotates the member 172 is swung back and forth moving the levers 163 and 164 in an obvious manner. The throw of the lever 164 is made smaller than that of lever 163 and the throw of these levers 163 may be varied through a wide range by the slot connections 170 and 171. The pawl 166 actuated by lever 164 turns the ratchet in a step by step manner in small angular increments and the shaft 96 is rotated in a like manner to move the trays 80. The amount of angular movement given the ratchet 161 is just sufficient to move the trays a distance equal to the distance between the transverse center lines of the molds in the tray 80, for example the distance indicated by the dimension $m$ in Fig. 2$^d$. Thus, the molds in a tray may be successively brought under the nozzles 195 of the depositor $a$. The pawl 167 meanwhile is being moved back and forth by lever 163 but, as long as this pawl rests on the smooth periphery of the disk 162 it gives no turning movement to the shaft 96. However, this pawl is so positioned with relation to the notches in disk 162 that it drops into one of these notches just as the last mold in a tray is being filled. Consequently, the next movement of the shaft 96 will be caused by the pawl 167 and disk 162. This movement, on account of the greater throw of lever 163 will move the shaft an amount sufficient to move the tray a distance equal to the distance between the center line of the last row of molds in a tray and the first row of molds in the tray next behind, for example, a distance indicated by the dimension $n$ in Fig. 2.

The depositing apparatus by which the molds are filled is too well known to require detailed description here as it is fully set forth in the Patent No. 661,008, granted Oct. 30, 1900 to Carlson. For the present purpose it will suffice to state that it comprises a series of pistons having plungers and a cut off bar which periodically connects these pistons with the outlet nozzles 195. The operating connections for these pistons and this cut off bar will now be described. Fixed on shaft 2 is an eccentric 177 which operates by a rod 178, an arm 179 pivoted at 180. A rod 181 has an adjustable pin and slot connection with arm 179 and is connected to a bar 196 which extends across the depositor *a* and operates all of the plungers 182. Also fixed on shaft 2 is a cylinder cam 183 which is arranged to move a lever 185. The latter has a slot which loosely engages shaft 2 and a pair of rolls 184 which engage opposite sides of the cam. Thus the lever 185 may be moved vertically up and down to rock an arm 187 pivotally connected with the lever at 186 and itself pivoted to frame A at 188. This arm 187 is connected by a rod 189 to a lever 190 (see Fig. 2ᵈ) which is mounted on a shaft 192 and has an integral arm 191. The latter is connected by a rod 194 to a member 193 which is attached to and operates the cut off bar on the operation of the parts above described from shaft 2. Suitable ball and socket joints are provided in the connections described as shown in the drawings as well as means for adjusting the throw of the levers.

All the devices heretofore described except the tray filling apparatus and leveler are operated from the depositor drive shaft 2 by the connections previously described. The apparatus on the depositor is operated directly from shaft 2 which continuously rotates. All the devices above mentioned are, however, operated from the shaft 4, which may be driven at various speeds from shaft 3 by the selective gear device *g*. In practice the trays 80 may have printed in the starch thereof various numbers of rows of molds per tray and the machine is accordingly built to provide for this condition. The machine illustrated is adjustable for from 5 to 20 rows of molds per tray. The length of the tray, however, remains constant and the total of all the step movements given to the tray from shaft 96 is thus the same no matter how many rows of molds there are in a tray. Furthermore, this total of all the step movements is accomplished by a half revolution of shaft 96, which explains the necessity for two notches in disk 162. Necessarily, with a large number of rows of molds per tray the throw of lever 164 must be made smaller than when a smaller number of rows are employed, since smaller step movements are needed. It is to be noted that no matter what the length of each step movement, this movement requires one complete rotation of shaft 2. Therefore, if shaft 3, which is driven from shaft 2, operated directly the other devices described, for example the chains 61, the trays might be fed faster than they should be. For example, if 20 rows of molds per tray are used, twenty revolutions of shaft 2 will be required to move the entire tray past the depositor. The shaft 4, if driven at constant speed might be arranged to feed one tray to the depositor for every 20 revolutions of shaft 2. However, if the ratchet drive for shaft 96 were varied to accommodate 5 rows of molds per tray, with the constant speed drive of the chains 61 just described, only one tray would be delivered to the depositor chains 159, when four should have been delivered, since only five revolutions of shaft 2 are required per tray. Thus, the necessity for variable speed drive of shaft 4 is made apparent. It will be noted that on shaft 4 within the gear case *g* are sixteen gears which increase gradually in diameter from the left to the right, as seen in Fig. 1ᶜ. The smallest gear is arranged to drive the shaft 4 at such a speed that one tray is delivered to the depositor chains 159 for every five revolutions of shaft 2. Thus, this smallest gear times all the other apparatus with the depositor for trays having five rows therein. Similarly the next gear is for six rows per tray and so on to the largest, which is for twenty rows per tray.

The tray feeding device, dumper, printer, traveling tray brush, and conveyer chains must necessarily be timed with the depositor for successful operation. Other apparatus associated with the machine need not be timed with the depositor, among which are the starch filling devices and the leveler previously described, which may operate continuously. The remaining apparatus not timed with the depositor which comprises principally means for cleaning the candies dumped from the trays will now be described. Below the path of the trays and extending from the dumper (see Fig. 4) to the extreme right hand end of frames B (see Fig. 1ᶜ) is a sieve frame 197. The latter is supported near the dumper from below by a pair of spaced links 198 (see Figs. 1ᵃ and 4) which are pivoted to the frame at 198'. The other end of the frame is supported from above by links 199 which are loosely mounted on shaft 95 (see Fig. 1ᶜ). Connected to the frame 197 in the manner shown in Fig. 4 is a rod 200 which is connected (see Fig. 1ᵃ) to a crank 201 on the drive shaft 37 heretofore described. This shaft 37 is continuously operated and causes a constant vibratory motion to be given to the sieve frame 197. Candies and starch falling from trays in the dumper drop upon a screen 202 and most of the starch passes through the sieve upon the bottom of frame 197, (see Fig. 4). The portion of the sieve frame 197 passing over the starch pit 99 is open at the bottom and has a second screen 203 of finer mesh than screen 102 which sifts the starch into the pit 99 (see Fig. 5). The remaining section of the sieve is constructed as shown in Fig. 3. The screens 202 and 203 are used as before but are bent to the shape shown and the screen 202 is lined with brushes 204 which constitute the well known brush lined sieve. Pivotally mounted on a rod 211 (see Fig. 3) are links 212 which support a brush 205. The rod 211 is mounted on a pair of spaced cross bars 213 (only one being shown) which are adjustably mounted on the frames B. Connected to one of the links 212 is a rod 210 which is movable by a crank 214 on shaft 31 previously described, whereby the brush 205 may be swung back and forth over the brushes 204. The frame of brush 205 has a chamber 206 and also apertures between the bristles of the brush. The chamber 206 is connected by a pipe 207, through a swing joint connection to a pipe 208 which leads to a fan 209 operated by shaft 67 heretofore described. Molded candies passing along the inclined screen 202 reach the brush lined section and on continued passage are thoroughly cleaned by the swinging brush 205. At the same time air is forced through the brush 205 to blow the loosened starch from the candies out of the sieve. The cleaned candies leave at the right end of frame B and pass onto a belt conveyer 215 having cross strips 216. This belt is carried on rolls mounted in the standards o one of which may be suitably driven from the pulley 217 (see Figs. 1ᶜ and 2ᶜ). Thus, the candies delivered from the sieve may be carried upwardly and outwardly to a tray 80' (see Fig. 2ᶜ) which is arranged within easy reach of the operator.

In the operation of a machine of the character described a certain amount of starch is found distributed entirely along the length of the machine and it is necessary to return this starch into the pit 99. Referring to Figs. 1ᶜ and 2ᶜ, a channeled shaped trough p is mounted between the depositor frames A and the frames B. This trough is arranged immediately in under the chains 61 so that the lugs 61' bear thereon. At intervals opposite lugs 61' on the chains 61 are interconnected by strips 218 which scrape the starch up the trough and carry it upon a floor 106 to the starch filling section of the machine. Here the starch drops upon a floor 107 already described. Chains 219 having scrapers 220 mounted therebetween are driven from sprockets on shaft 23 heretofore described and are carried also on sprockets on idler shafts 221 (see Fig. 5). These scrapers 220 remove starch from the floor 107 and allow it to fall upon the floor 99 from which it is later removed by the elevator buckets 103 as already described. On either side of the starch pit 99 are floors 100, slightly raised from the floor of the pit 99 which forms a bottom for the machine. On one side of the pit are chains 222 carried by sprockets on shafts 25 and 224 (see Figs. 1ᵇ and 1ᶜ) which are driven from the former shaft. Between these chains and secured to lugs thereon are scrapers 223 (see Fig. 3) which return all starch on the floor 100 from the right hand end of the machine to the pit 99. On the other side of the pit 99 is a similar chain driven by shaft 26 already described and carried by the latter and an idler shaft 225 (see Fig. 1ᵃ). The scrapers 223 return starch from the left hand end of the machine along the floor 100 to the starch pit 99 in a similar manner. The chains 61 which deliver trays to the depositor chains 159 run on sprockets loose on the shaft 96, as already described and if the depositor shaft were turned precisely the theoretical amount required no connection between these sprockets would be necessary. However, in practice it is not always possible to so turn the shaft 96 for the reason that to secure the precise movement required in each case the ratchet 161 must have a number of teeth equal to the least common multiple of all the numbers from five to twenty inclusive. A ratchet having this number of teeth could be properly subdivided into equal parts for trays having from five to twenty rows of molds. A ratchet having such a number of teeth would either be of excessive diameter or if the diameter were kept constant the teeth on the ratchet would necessarily be too small for a practical machine. Therefore, in practice a ratchet is used having sufficient teeth so that the necessary angular movements may be approximated within reasonable limits. A ratchet having 180 teeth is frequently used but it will be obvious that with such a number of teeth an error is made as for instance when thirteen rows per tray are used. This error is not great, however, and does not prevent the material from nozzles 195 from properly falling into the molds although the center lines of the latter may not exactly aline with the center line of the nozzles 195. The errors made would, if allowed to continue, soon cause trouble since they are of a cumulative nature. Since these errors are cumulative mechanical means are employed to correct the error at regular intervals and one means is shown in Figs. 8, 9, and 10. One of the sprockets on shaft 96 bearing the chains 60 is represented by the numeral 49 in Fig. 8 and 48 is one of the sprockets keyed to shaft 96 which carries and drives the depositor chains 159. Fixed in the sprocket 49 is a pin 47 and fixed to the sprocket 48 is a spring 46, bent as clearly shown in Fig. 9. The sprocket 49 is indirectly operated from the shaft 3 through the selective gear device and, consequently, as has already been explained, drives the chains 61 at the theoretically correct speed to deliver a tray 80 to the depositor at the proper intervals. The pin 47 is normally set so that it engages the shouldered portion of spring 46 as shown in Fig.

9. Now, if due to the limitations in the number of teeth in ratchet 161 an error arises and the sprocket 48 is behind its correct position, the pin 47 will, when the chains 61 operate, engage the shouldered portion of spring 46 and turn the sprocket 48 along with it to the proper position. Thus, every time a tray is delivered the error in the movement of sprocket 48 is corrected so that it never can grow to an amount great enough to interfere with the successful operation of the machine. If the sprocket 48 has been moved too far ahead of its correct position it is obvious that the pin 47 cannot correct this error. However, the necessary correction for this sort of an error is provided by the notched disk 162. If the sprocket 48 is ahead of its proper position, it is clear that the pawl 167 will, just prior to its movement, which causes the tray 80 to take the long step $n$, pass behind one of the notches instead of dropping into the notch. Thus, if the pawl 167 rests on the smooth periphery of disk 162 behind the notch, it will not, when moved clockwise to rotate the disk, turn the disk until the pawl drops into the notch. Thereafter, it will turn the disk 162 and shaft 96 but not as much as it would ordinarily if the sprocket were properly positioned. Thus, whether the sprocket 48 is ahead or behind its correct position, it is positively and properly positioned every time a tray is delivered to the depositor.

A modified form of dumper is shown in Figs. 11, 12 and 13. This modified device will now be described. The operating shaft 13, formerly described mounted in a bearing $q$ is keyed to a member 226 and the latter is secured to a bracket 85, similar to that described, by the bolts shown in Figs. 11 and 12. These bolts are adjustable in curved slots in member 226 and permit slight angular adjustments of the brackets 85 relative to the shaft 13. The spring pressed clamp 87 is employed as formerly, as well as the angle irons 88. Centrally arranged and vertically movable in the bracket 85 is a pin 230 which is engaged (see Fig. 13) by a forked arm of a bell crank 229 pivoted at 228. A depending arm of the crank 229 bears a roll which engages a cam 227. The latter is fixed to a necked down portion of bracket $q$ as shown in Fig. 13 and has the cam outline shown in Fig. 11. On the lower end of the pin 230 is a clamp 231 and between the latter and the bearing for the pin 230 is a strong spring. The springs acting directly on the clamp 87 may be made relatively light so as to have only a slight frictional engagement with the tray. When, however, the dumper is rotated by shaft 13 the roll on the bell crank 229 leaves the cam 227 and the strong centrally arranged spring forces the clamp 231 against the member 87 to securely hold the tray in the dumper. By this construction a large amount of wear on the trays 80 is avoided since the relatively light springs offer little resistance thereto.

The general operation of the machine will now be described. Trays filled with molded candies cast in starch and which have set are fed one by one at proper intervals to the conveyers 60. The latter during the feeding operation are at rest but are thereafter actuated to deliver in a step by step manner one of the filled trays 80 to the dumper apparatus. This apparatus operates in unison with the feeding device and, after the chains 60 come to rest, empties candies and starch from the tray. The empty tray is taken from the dumper as described by conveyers 61 and carried first to a series of starch elevators where the trays are heaped with sifted starch delivered from the bottom of the machine. The trays, on continued step movement pass in under the leveler 110 where the surplus starch is scraped off leaving a flat smooth surface. Further movement brings the trays past stationary brushes 119 which clean the ends of the tray and the tray comes to rest in a position wherein the traveling brush 120 may brush its forward edge. The rearward edge of the tray 80 is cleaned by a return movement of the same brush 120 after the tray has been moved through its next step. Continued step by step movement brings a tray to rest in under the printer where cores 136 are impressed on the starch to form molds as described. Finally, the chains 61 deliver a filled tray with suitable molding recess to the depositor chains 159 which are moved with a series of short steps by mechanism already described. These small step by step movements carry each row of molds in a tray successively under the nozzles 195 and, as each row of molds comes to rest thereunder, all the molds in the row are simultaneously filled by the operation of members 182 and 193 in the usual manner. The trays after passing through the depositor are, after a suitable interval has elapsed sufficient to allow the molded pieces of candy to set, returned to the feeding apparatus, and again passed through the cycle of operation described.

The candies and starch, which are emptied upon the sieve 110 are separated in the manner already described, the starch being returned to the pit 99 where it is used over and over again to fill the trays. The candies, pass down the inclined screen 202 and are thoroughly brushed by the brushes 204 and 205 to remove all traces of starch therefrom. The air blast through brush 205 effectually removes the starch loosened from the candies by the brushes and the cleaned candies emerge from the sieve, as already described, upon the conveyer 215 from whence they are delivered to the operator.

The depositor driving apparatus is adjustable within wide limits for various numbers of rows of molds per tray and the operator, having adjusted such apparatus for a certain number of rows of molds, for example, thirteen, moves the arm 51 until the gear 53 meshes with the ninth gear from the left on shaft 4. This gear drives the shaft 4 at exactly the proper speed in relation to shafts 2 and 3 to time every necessary operation with the depositor. Thus, the chains 61, will deliver one tray to the depositor chains 159 for every thirteen revolutions of the shaft 2. The printer and traveling brush 120 are also driven from shaft 4 and are timed to operate when the chains 61 which operate intermittently are at rest. The tray feeding apparatus is similarly timed to feed one tray to the chains 60 and the latter to deliver one tray to the dumper, while the depositor acts upon one tray and the dumper in turn delivers one tray to the chains 61 in this same interval. Thus, the tray feeding apparatus, dumper and chains 61 which operate simultaneously, together with the chains 60, brush 120 and printer which operate simultaneously, when the first named set is at rest, are all timed to the operations of the depositor.

The timing arrangement just described would be sufficient to insure successful operation if the depositor ratchet drive could be set precisely. However, as has been already set forth, errors in this ratchet drive occur due to the practical limitations in the construction of the ratchet 161 as described. Since, in practice, these errors must be tolerated, a means has been provided to correct them, at definite intervals, in the manner already fully set forth. Thus the selective gear drive g, the connection between the sprockets 48 and 49 and the disk 162 coöperate to insure operations properly synchronized with the depositor. The proper timing of the several parts of the apparatus, and especially the accurate timing of the depositor conveying means, saves to a material degree the amount of superdivision required in operation.

The machine built as described has various combinations and arrangements of improved character. The invention in its proper scope will be defined in the annexed claims rather than by the foregoing detailed description.

What I claim is:

1. An apparatus for molding confections, comprising in combination, means to fill a continuing series of trays with suitable material, as starch, devices to level and form rows of recesses of a desired shape in the starch to prepare the latter for the molding operation, a depositor operable to successively fill transverse rows of recesses with confection for molding, and two sets of conveying mechanisms, one intermittently operable to move the trays at least their own length to and from said means and devices, and the other operable to receive trays from the first and move them under the depositor in appropriate steps corresponding to the distance between successive transverse rows of recesses in the same and successive trays, adjustable driving means for the first conveying mechanism to time its movements in accordance with the number of transverse rows made in a tray, and adjustable driving means for the second conveying mechanism to time its movements in accordance with the distance between transverse rows, said driving means being constructed and arranged so that the trays all move a given distance in a given time, and a supplementary driving device connected to said conveying mechanisms and operable on the movement of one to drive the other during its normal period of rest whenever the conveying mechanisms are out of proper timed relation.

2. An apparatus for molding confections, comprising in combination, a depositor for the goods to be molded, a conveyer to successively move trays under the depositor, driving means for the conveyer operable to intermittently move the latter a series of steps each substantially equal to the distance between transverse rows of recesses in a tray and periodically a distance between transverse rows in successive trays, adjustable devices for said driving means to limit the movement thereof in accordance with the arrangement of recesses in a tray, mechanisms to fill the trays with starch or the like and form molding recesses therein including a conveying means operable to feed trays one by one to the depositor, adjustable driving means therefor to regulate the time of feeding a tray to the depositor and a supplementary driving device connected to an operable part of the conveying means and engageable with an operable part of said conveyer and constructed and arranged to impart a supplementary movement to the conveyer to keep it in proper timed relation with said conveying means.

3. An apparatus for molding confections, comprising in combination, two sets of mechanisms adapted to handle the trays for molding, one set arranged to fill trays with starch or the like, and form suitable recesses therein for the molded goods, the other set including a depositor to fill said recesses, driving mechanism for the second set operable to move the trays forward step by step in accordance with the longitudinal distance between recesses in a tray, driving devices for the first set adjustable to move the successive trays into the depositor in a single step in periods substantially equal to the movement of said driving means to advance each tray its own length and a supplementary driving device operable on the movement of said driving devices to move said driving means a distance to correct any lag between the respective movements of the trays in the two sets of mechanisms.

4. An apparatus for molding confectionery, comprising in combination, a framework having a trackway, a series of trays arranged to fit said trackway, two sets of conveying chains having sprockets therefor, one set arranged in line with the other to move the trays along the trackway, a power shaft, separate driving means between the latter and each set of conveying chains, a series of speed changing gears interposed in the driving means to one set, and a pawl and ratchet driven by a link motion mechanism interposed in the driving means of the other set and including adjusting devices to correspond with the series of speed changing gears whereby the ratio of the separate driving means may be approximately determined and a supplementary driving device arranged in part on each driving means and operable when the ratio is not accurately determined to step forward one set of conveying chains to accurate timed relation with the other at frequent intervals by engagement of one part with the other and various mechanisms associated with and connected with the driving means for timed operation with the respective conveying chains.

5. In an apparatus for molding confectionery, a depositor, a power shaft therefor, a conveyer operable to move trays step by step under the depositor, a driving shaft therefor, a ratchet wheel keyed to the driving shaft, a bell crank lever loose on said shaft, a pawl on the end thereof operable to drive the ratchet wheel, a rock arm pivoted to the frame, a crank on the power shaft, link connections between the rock arm and the lever and crank, said rock arm being provided with curved slots in which said links are connected and each having respectively a radius equal to the link connected to it, whereby the degree of movement of the ratchet wheel may be conveniently adjusted, conveying chains having sprockets loose on said driving shaft to deliver trays to the depositor, operable at different intervals than the depositor chains, driving means therefor connected to said power shaft, and means between the sprockets engageable to drive said conveyer whenever the conveying chains operate to deliver a tray to the depositor before the conveyer has been moved a proper distance to receive it.

6. An apparatus for molding confections, comprising in combination, a longitudinal trackway, mechanism to successively feed trays to said trackway, a tumbler to receive and rotate successive trays, a starch conveyer looped over the trackway and operable to fill the trays, a scraper arranged above the trackway and adjustable to different positions to level the starch in the filled trays, a brush arranged to travel transversely of the trays to clean the ends and top edges thereof, a printer arranged above the trackway and operable to press down the starch in the tray and form suitable molding recesses therein, a depositor arranged above the trackway operable to deposit the goods to be molded in said recesses, a power shaft and driving connections therefrom to the several operable elements along the trackway arranged to drive them in timed relation one to the other, conveying means to move the trays along the trackway in timed relation with respect to said operable elements, a vibratory screened container arranged under the tumbler having an outlet to feed the starch conveyer and separate the molded confectionery from the starch and a brush lined sieve arranged in line with said container to receive and clean the confectionery, an air brush mounted to stir the confectionery on the sieve, a conveyer arranged transversely to said sieve to receive the cleaned confectionery and deliver it at the side of the apparatus and driving connections between the power shaft and said container, brush and conveyer.

7. In an apparatus for molding confectionery, a trackway for trays, a tumbler interposed in the trackway operable to receive trays successively one by one and rotate them for dumping, spring pressed clamping devices arranged on the tumbler to engage the sides of the tray when the tumbler starts to turn, means to hold said devices out of operation when the tray is right side up, and mechanism to intermittently operate and turn said tumbler.

8. An apparatus for molding candy in starch or the like comprising in combination, a framework, a trackway thereon, means to successively feed trays one by one to said trackway, a tray tumbler, a tray filler, a tray leveler, a tray printer and a depositor all in line with said trackway, conveying means from the tray feeding means to the tumbler, a second conveying means from the tumbler to the tray leveler, printer and depositor, and a third conveying means for the trays as they pass under the depositor, driving means for the latter operable intermittently to feed the trays under the depositor step by step including adjusting devices to vary the length of step, and automatically operable means to increase the distance of one step intermittently, driving means for said two first named conveyers operable intermittently to feed the trays their own length, adjusting means to time the last mentioned driving means to the desired number of steps between the long steps of the depositor driving means and driving connections between said second mentioned conveyer and the depositor conveyer operable intermittently to move the latter into properly timed relation with the former.

ALONZO LINTON BAUSMAN.